United States Patent

[11] 3,611,301

[72] Inventor Herman D. Parks
Norwalk, Conn.
[21] Appl. No. 728,658
[22] Filed May 13, 1968
[45] Patented Oct. 5, 1971
[73] Assignee Time Incorporated
New York, N.Y.

[54] SYSTEMS FOR INFORMATIONAL PROCESSING OF DISPATCHES

4 Claims, 5 Drawing Figs.

[52] U.S. Cl. .......... 340/172.5
[51] Int. Cl. .......... G06f 15/02, G06f 15/40
[50] Field of Search .......... 340/172.5; 235/157

[56] References Cited

UNITED STATES PATENTS

| | | | |
|---|---|---|---|
| 3,248,705 | 4/1966 | Dammann et al. | 340/172.5 |
| 3,297,997 | 1/1967 | Grady et al. | 340/172.5 |
| 3,323,119 | 5/1967 | Barcomb et al. | 340/172.5 X |
| 3,328,764 | 6/1967 | Sorensen et al. | 340/172.5 |
| 3,344,401 | 9/1967 | MacDonald et al. | 340/172.5 |

OTHER REFERENCES

Leeds and Weinberg, Computer Programming Fundamentals, 1961, pp. 63–68

Haag, Comprehensive Fortran Programming, 1965, pp. 69–73

*Primary Examiner*—Paul J. Henon
*Assistant Examiner*—Ronald F. Chapuran
*Attorney*—Brumbaugh, Graves, Donohue & Raymond

ABSTRACT: Received dispatches are informationally processed by a system comprised of a program controlled central data-processor, high-speed printers and, also, data storage and visual display units of which both types of units are in two-way communication with the processor. Logging data concerning a received dispatch is entered via a display unit with the following results (a) determination from such data and stored distribution tables of print orders implemented by the printing by selected printers of copies of the dispatch, and (b) supplementation of such data by stored lists. The system acts as a central file accessible through the display units for the purpose of either input or output of information.

INVENTOR.
HERMAN D. PARKS

BY Brumbaugh, Free, Graves & Donohue
his ATTORNEYS

INVENTOR.
HERMAN D. PARKS

BY his ATTORNEYS

INVENTOR.
HERMAN D. PARKS

BY
Brumbaugh, Free, Graves & Donohue his ATTORNEYS

INVENTOR.
HERMAN D. PARKS

BY Brumbaugh, Free, Graves & Donohue his ATTORNEYS

PATENTED OCT 5 1971

3,611,301

SHEET 5 OF 5

INVENTOR
HERMAN D. PARKS
BY
Brumbaugh Free Graves & Donohue
his ATTORNEYS

SYSTEMS FOR INFORMATIONAL PROCESSING OF DISPATCHES

This invention relates generally to systems for processing information provided by electrically transmitted incoming and/or outgoing dispatches. More particularly, this invention relates to systems of such sort wherein electronic processing replaces manual processing in many of the steps involved in the routing, filing and indexing of such information.

In companies wherein substantial business is conducted by means of dispatches arriving at or sent out from one or more communication centers, it has been conventional to first convert the information of each dispatch into the form of printed copies and, thereafter, to utilize such printed copies as the medium for effecting distribution, filing and classification of the information provided by the dispatch. To process dispatch-derived information in such way is, however, disadvantageous for the reason among others that a large number of clerical employees and complex clerical procedures are required to perform the information handling operations. Further, processing delays and/or scattering of files may make certain information unavailable when wanted and other information obtainable only with undue effort. Still further, a very large amount paper is often required to assure printed copies of each of many dispatches for all persons who should or wish to be cognizant of them and for all files to which those dispatches are pertinent.

It is, accordingly, an object of this invention to provide systems for processing dispatch-derived information which are free of one or more of the disadvantages noted above.

Another object of the invention is to provide dispatch-processing systems wherein paper files are replaced by electronic data storage files from which information concerning dispatches may be readily retrieved either for the purpose of reviewing such information or for the purpose of effecting selective distribution thereof or for taking other action thereon.

A further object of the invention is to provide systems of such sort which are adapted to eliminate duplication in the distribution of dispatches.

A still further object of the invention is to provide dispatch-processing systems which afford a user thereof the option of inspecting information concerning dispatches either by way of an electronic display of such information or by way of a printed copy thereof.

These and other objects are realized in accordance with the invention by providing a system comprised of receiving means for signals representing electrically transmitted dispatches, data storage means for retrievably storing coded data derived from such signals, program-controlled data-processing means for effecting operations on such data, printer means controlled by such data-processing means, and visual display means in two-way communication with said data-processing means and having both a screen for electronically displaying selected information and a signaling keyboard by which said data-processing means may be commanded to perform desired operations on the stored coded data. The described components of such system are operably coupled together to effect in an electronic and automatic manner a number of later-described steps involved in the processing of information provided by or pertaining to the received dispatches.

For a better understanding of the invention, reference is made to the following description of an exemplary embodiment thereof and to the accompanying drawings wherein:

FIGS. 1*a* and 1*b* are related drawings to be viewed with the bottom of FIG. 1*a* in registration with the top of FIG. 1*b*, the two drawings together representing a flow chart of procedures now used to process electrically transmitted dispatches;

Figure 1A:
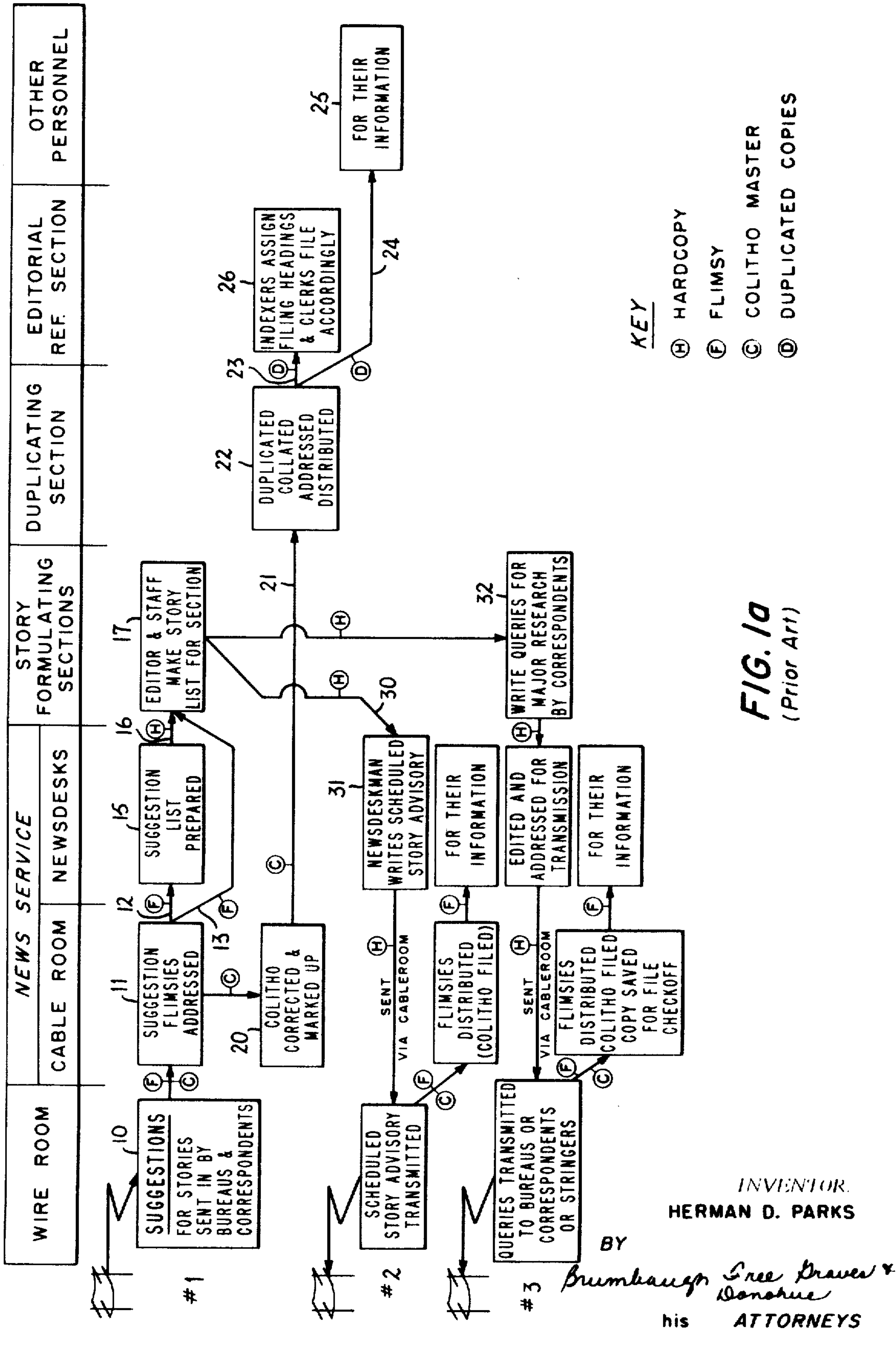
FIG. 1a (Prior Art)
Figure 1B:
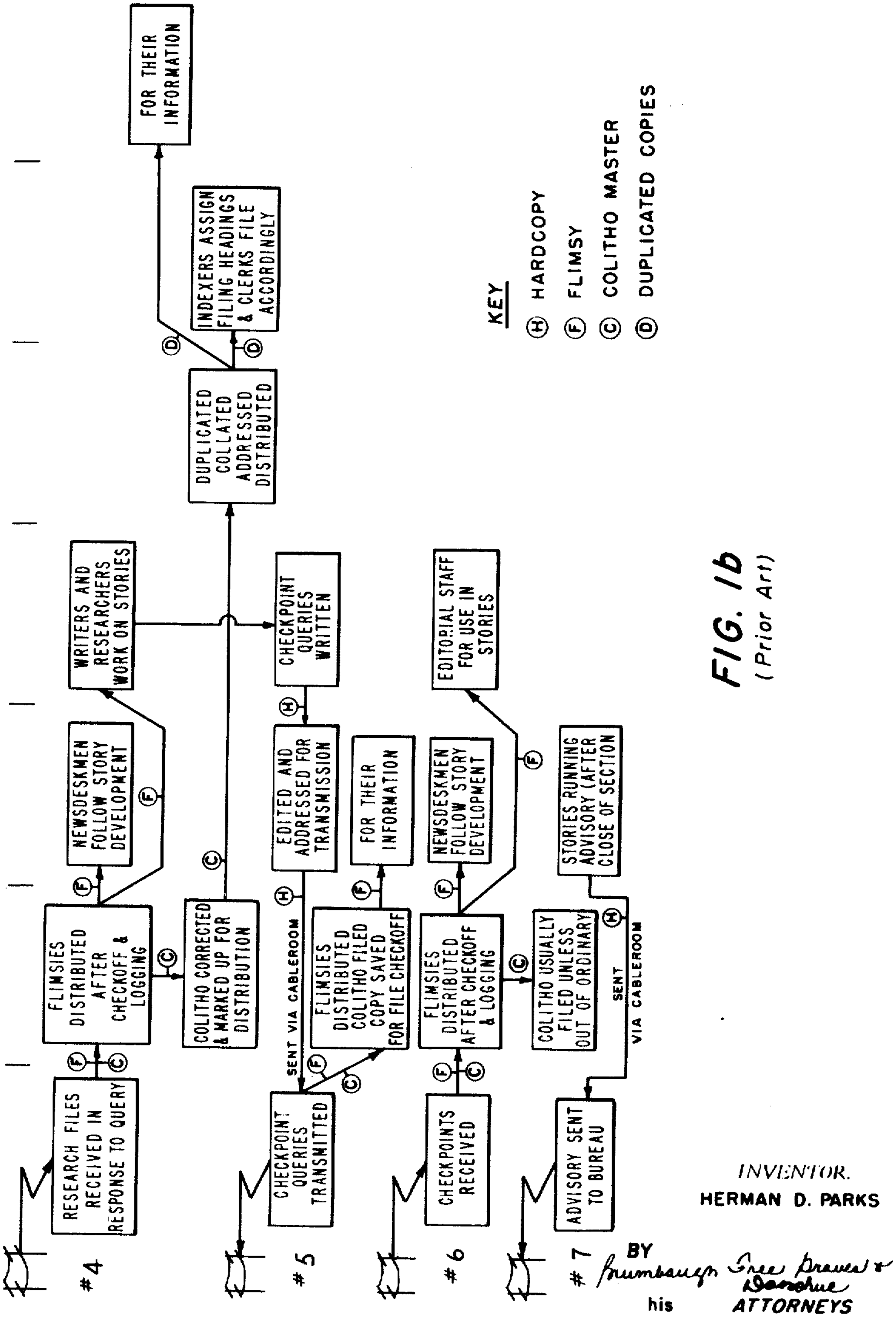
FIG. 1b (Prior Art)

Turning first to FIGS. 1*a* and 1*b*, those drawings represent a communication center and other parts of the organization of a company publishing a weekly magazine in which appear news articles based on incoming and outgoing dispatches. Such organization is divided into a number of sections of which some are indicated across the top of FIG. 1*a* as being the "Wire Room," "Cable Room," "Newsdesks" and so on.

The wire room has teleprinters and other devices which reproduce in printed form all electrically transmitted dispatches sent to or from the center. Each dispatch is reproduced in the form of a COLITHO master copy and a limited number (e.g., seven) of flimsy copies, the master copy and the flimsies being designated in FIGS. 1*a* and 1*b* by the coded symbols "C" and "F," respectively. Such copies are forwarded to the appropriate section which may be either connected with newsgathering or may pertain to some other activity of the company.

Concentrating attention on the matter of newsgathering and starting with line 01 of FIG. 1*a*, stories to appear in the coming issue of the magazine are determined in part by dispatches 10 in the nature of suggestions sent in from the field by bureaus and correspondents at the beginning of the week. The master and flimsy copies of each such dispatch are forwarded from the wire room to the cable room which addresses the flimsies (box 11) and forwards some of them (arrow 12) to the newsdesks and others (arrow 13) to the appropriate story formulating section comprised of writers and researchers story formulating section comprised of writers and researchers who draft and edit the stories for the magazine from the factual material made available to them. It might be noted that there are a number of such organizational sections of which each is responsible for the composing and editing of stories for a corresponding topical section of the magazine.

From an accumulation of received suggestion dispatches, the men in the newsdesk section prepare in hardcopy (designated by the coded symbol "H") a story suggestion list (box 15) forwarded to the story formulating sections (arrow 16). An editor and a staff then utilize that suggestion list and the flimsies earlier received (see arrow 13) to draw up (box 17) a list of stories scheduled for the coming issue.

Returning for a moment of the cable room, if a dispatch is deemed to warrant more than the earlier described limited distribution to the newsdesk and story formulating sections, the master copy of the dispatch is corrected and marked up (box 20) and is then sent (arrow 21) to the duplicating section which effects reproduction of the master copy in the form of ditto copies (box 22) indicated by the circled symbol "D." The duplicating section then forwards (arrow 23) some of those ditto copies to the editorial reference secton and others (arrow 24) to information addressees (box 25). In the editorial reference section, the contents of received dispatches are analyzed for subject matter falling under different subject headings and are then filed (box 26) in paper reference files according to a filing scheme based on such subject headings.

The mentioned scheduled story list serves as the starting point for further newsgathering activities as follows. First, a hardcopy of such list is sent (arrow 30) to the newsdeskmen, who thereupon write advisories (box 31) of scheduled stories for the benefit in the field of the bureaus and correspondents concerned. The routing, transmission and other handling of such advisories and the dispatches arising therefrom is shown in line 02 of FIG. 1*a*. Moreover, the story formulating sections prepare queries (box 32) of facts which should be ascertained by major research in the field in order to gather the background necessary for the writing of the scheduled stories. The handling of the dispatches setting forth such major queries are shown in line 03. Each such advisory dispatch and query dispatch which is transmitted is checked off on a weekly story progress list (not shown) against the scheduled story to which the dispatch pertains. The first entries in such weekly progress list are, of course, designations for the stories in the scheduled list thereof.

As the week progresses, the answers to the major queries are sent in from the field in the form of "research file"

dispatches handled as shown in line 04 (FIG. 1b). If a research file dispatch for a particular story should not happen to contain all the information needed for the story, then a checkpoint query about the missing information is sent by way of a dispatch to the appropriate bureau or correspondent to which the research on the story has been assigned (FIG. 1b, line 05). The dispatches answering the checkpoint queries are handled as depicted in line 06. Upon receiving such answers, the information needed to finish the drafting of any story should be complete, and the only further dispatches sent out in the course of the weekly newsgathering cycle are ones advising the bureaus and correspondents in the filed of the stories which will be running in the issue about to be published (line 07). The transmissions of checkpoint queries; receipt of answers thereto and the sending of the advisory "story running" dispatches are, of course, checked off on the story progress list so as to render that list an up-to-date record of the stage of completion of each scheduled story.

FIGS. 1a and 11b show steps of information handling and paths of information flow which are not discussed in detail herein for the reason that the nature of such steps and paths are self-evident from the drawings themselves and from the description previously given.

The main information processing activities of FIGS. 1a and 1b are accompanied by side activities which are not illustrated, but of which some are as follows. First, it is necessary for the clerical personnel responsive for the distribution of dispatches to keep and maintain current lists of the addressees to which dispatches in different categories should be distributed. Second, since individual correspondents may be almost continuously on the move, it is also necessary to maintain a current "whereabouts" list providing information on the present location of each correspondent, how he may be reached, and so forth. Third, it is also necessary or desirable to maintain a list indicating current distribution of workload. Other side activities which may take place are arranging for exchange of information through the center between bureaus or correspondents working on different but related stories and running word count analyses for the purpose of determining allocations among various sections and departments of the cost of operating the communications center.

While the clerical mode of information processing shown in FIGS. 1a and 1b has up to now been the best available, it suffers from the disadvantages of requiring many employees to perform a large number of clerical operations with ensuing high overhead and with attendant delays in getting the information to the ultimate addressees or into the proper files. Noteworthy among such delays is the one which is involved in the indexing of dispatches according to subject heading by the Editorial reference section, and which is usually long enough that material in the reference files can not be used for current research purposes. Further, since information pertaining to any particular dispatch or subject is scattered among a number of files, the assembling of needed information is often laborious. For example, because of scattering of information on correspondents, the task of keeping up with the locations of a traveling correspondent may be quite a burdensome one. Finally, because, at the least, a substantial number of copies of each incoming or outgoing dispatch must be printed for purposes of distribution or filing, and because a much greater number of copies of more important dispatches must be printed to assure the bringing of such dispatches to the attention of each addressee who might be interested, the amount of paper consumed by the system of FIGS. 1a and 1b is very large needed.

Figure 2:
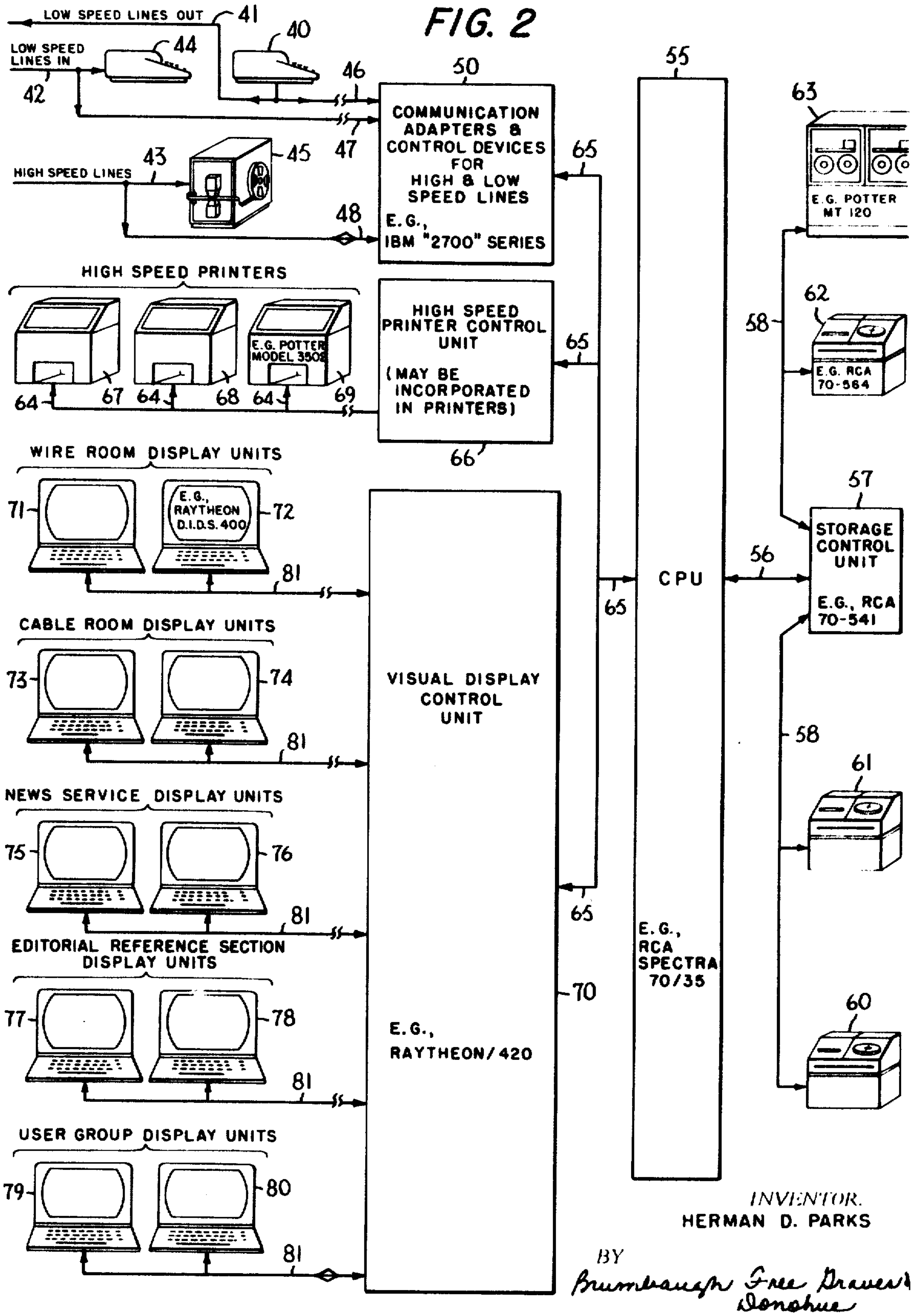
FIG. 2 is a block diagram of an exemplary system according to the invention for replacing the procedures shown by FIGS. 1*a* and 1*b*.

FIG. 2 shows an electronic data-processing system for performing automatically a great many of the information processing functions shown by FIGS. 1a and 1b and for greatly reducing consumption of paper. In FIG. 2, outgoing dispatches are typed on keyboards 40 in the wire room and are transmitted via lines 41. Incoming dispatches may be received either via low speed lines 42 or high-speed lines 43. To assure having a record of all dispatches incoming during a breakdown of the FIG. 2 system (if that unlikely event should occur), a single teletypewriter 44 (e.g. a Model 028 manufactured by the Teletype Corp.) produces a printed protection copy of each dispatch arriving on lines 42. Similarly, perforator 45 (e.g. a TALLY Model 0301 manufactured by Tally Corp.) produces a record on a protection tape of the contents of each dispatch arriving on lines 43.

The signals representing the outgoing and incoming dispatches are fed via, respectively, the lines 46 and the lines 47 or 48 to a receiving means in the form of an adapter and control unit 50 which may be a "2700 Series" control unit manufactured by the International Business Machines Corporation. Unit 50 is interposed between the sources of these signals and a program-controlled central data--processing unit 55 which may be, for example, a SPECTRA 70/35 manufactured by the Radio Corporation of America. As shown, unit 55 is at the center of the FIG. 2 system to serve as an intermediate transference or processing device for all information moving between any two terminal devices of the system. These terminal devices are coupled to unit 55 through the shown go-between control units of which one is the previously mentioned unit 50 interposed between the central data-processor 55 and the sources of the dispatch signals.

To consider some of the other terminal devices of the FIG. 2 system, processor 55 is coupled through lines 56, storage control unit 57 and lines 58 to a plurality of data storage devices 60, 61, 62 and 63 so as to be in two-way communication with each of these devices. Unit 57 may be, for example, an RCA 70–541 Storage Control Unit. Each of storage devices 60–63 is adapted to store coded data received from unit 55 and to retrieve and playback that data to unit 55 upon receiving a command to do so. Of the four shown storage devices, unit 60 may serve as a short term data storage means, whereas the other units 61–63 may serve as long term data storage means. Data storage devices of such sort are per se well known in the art and are generally either of the type wherein data is stored on and retrieved from magnetic tapes (unit 63) or of the disc pack type wherein data is stored on and retrieved from magnetic discs. Unit 63 may be, for example, a Potter Model MT 120 and units 60–62 may each be an RCA 70–564 disc pack. The memory capacity of units 60–63 may be supplemented by short term memory means in the form of magnetic core storage provided within the unit 55 itself.

As generally indicated by lines 65, central processor unit 55 is in communication (through adapter 50) with the lines 41 and 42, 43 for, respectively, the outgoing and incoming dispatches. Similarly, as indicated by lines 65, processor unit 55 is in communication through printer control unit 66 with a plurality of high-speed printers controlled by the processor unit and disposed remotely therefrom. Each of the shown printers may be a Potter Model 03502. That particular printer includes a built-in control unit. Therefore, if the printers are each a Potter Model 03502, the separate control unit 66 may be eliminated.

FIG. 2 depicts only three printers 67, 68 and 69 of which the first, second and third may be located (FIG. 1) in, respectively, the cable room, the room housing the newsdeskmen, and the room housing the Editorial Reference Section. It is to be understood, however, that a number of printers considerably in excess of three would normally be utilized as components of the described system. Each printer is strategically located to be proximate prospective addressees of dispatches processed by the system.

Each of the printers may be selectively activated by processor unit 55 and thereafter be controlled by flow of data from such unit to printout individually addressed alphanumeric copies of dispatches emerging in fan fold form from the delivery chute of the printer.

As further generally indicated by lines 65 in FIG. 2, the central data-processing unit 55 is in two-way communication through a control unit 70 and line 81 with a plurality of visual display units of which exemplary ones are designated in FIG. 2 as units 71–80 inclusive. Unit 70 may be a Raytheon/420. The visual display units 71–80 are shown as being divided into groups of two disposed at different locations. Thus, units 71, 72, units 73, 74 units 75, 76, and units 77, 78 are disposed in, respectively, the wire room, cable room, newsdesk section and the Editorial Reference Section (FIG. 1*a*). Units 79 and 80 are disposed elsewhere so as to be accessible to casual users of the system. Each of units 71–80 may be a Raytheon DIDS 400.

Figure 4:
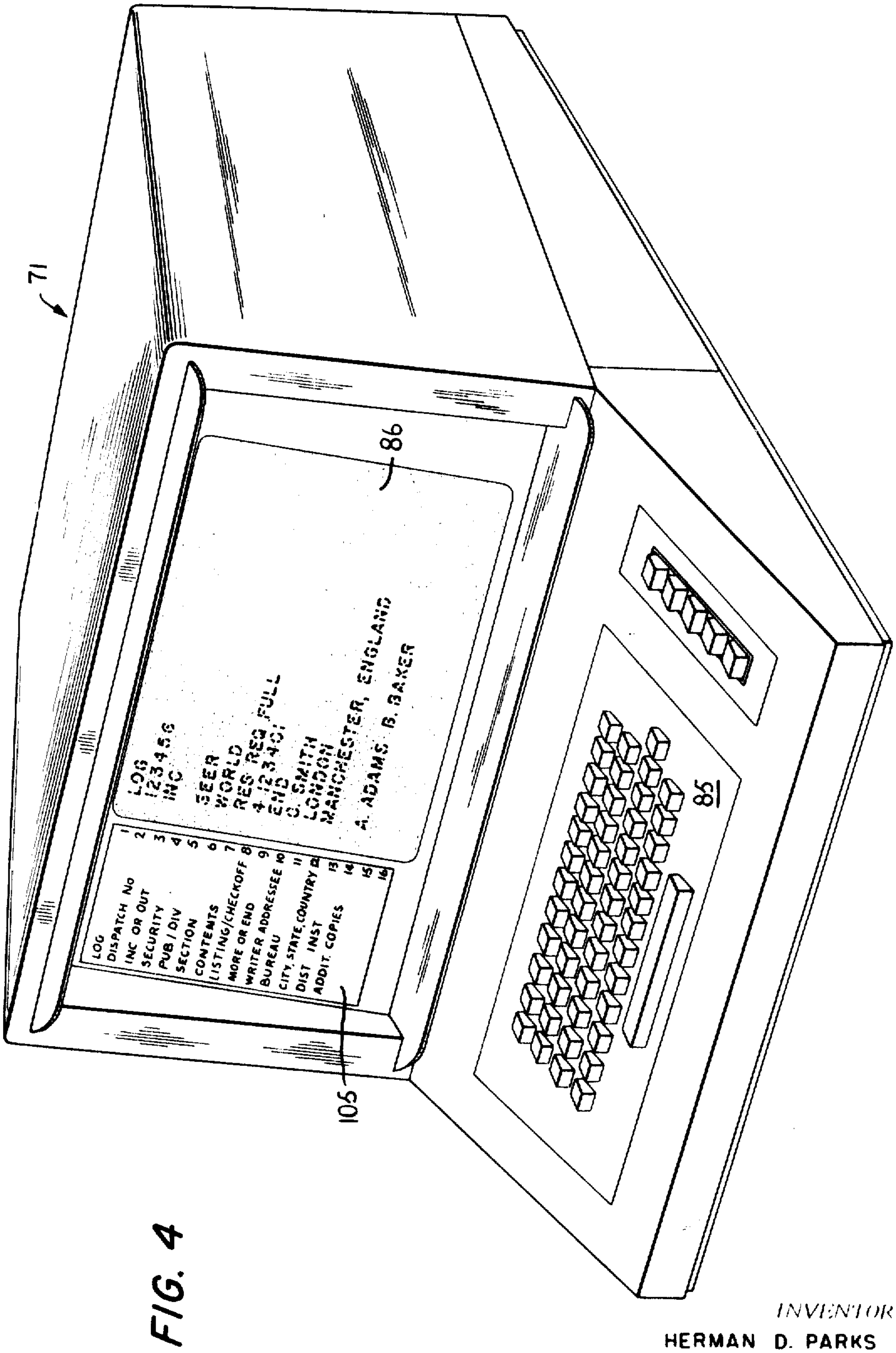
FIG. 4 is a perspective view of one of the display units of the FIG. 2 system.

FIG. 4 shows in detail one of the described visual display units as, for example, the unit 71. As illustrated by that FIG., each unit is comprised of a signaling keyborad 85 and a display screen 86 provided by the screen of a cathode-ray tube. Also included in the display unit is a local memory (not shown) adapted under the control of a command or commands from the keyboard to retrieve and transfer to the cathode-ray tube (for purposes of display on the screen, thereof) a flow of data which has been stored in the memory, and which has been derived either from signals fed to the memory from the keyboard or from information fed to the memory from the processing unit 55. Irrespective, of the origin of such data, the flow of data to the cathode-ray tube produces a display in alphanumeric form on screen 86 of selected numerals, alphabetical letters, symbols and so forth. For the purposes of providing such a display, screen 86 is subdivided into rows and columns of character positions in each of which a character (letter, numeral, other symbol or a blank) may appear. When the characters displayed on screen 86 are derived from actuation of keyboard 85, the location on screen 86 of the next position for entry of a character may be marked by a cursor line appearing beneath that position. In operation, the screen is filled in by successively generated lines of characters to form one frame of displayed characters of which a plurality may in turn be displayed in succession.

Each of the described visual display units may be utilized in each of the following two ways. First, the user of the unit may manipulate the keyboard 85 to produce signals operable through the local memory of the unit to cause display on screen 86 of one or more frames of characters entered on the keyboard. With such first mode of employment and after completion of each frame, the user actuates the keyboard to produce a transfer command signal causing coded data representing the characters of that frame to be transferred from the local memory of the display unit through the central processing unit 55 (FIG. 2) to one of the storage devices 60–63. Second, the user may manipulate the keyboard to produce signals identifying previously stored information which the user wants to view and commanding that such information be supplied from the appropriate data storage device to the display unit in question. The central processor unit responds to such identificatory and command signals to call out the proper coded data from storage and to feed such data to the local memory of the display unit so as to cause the desired display to appear on the screen. Whether, however, the display unit is being used in the first mode or in the second mode, the unit is in communication with the control processor 55 for only a short interval of time so as to make a minimum demand upon the time of the processor.

Figure 3:
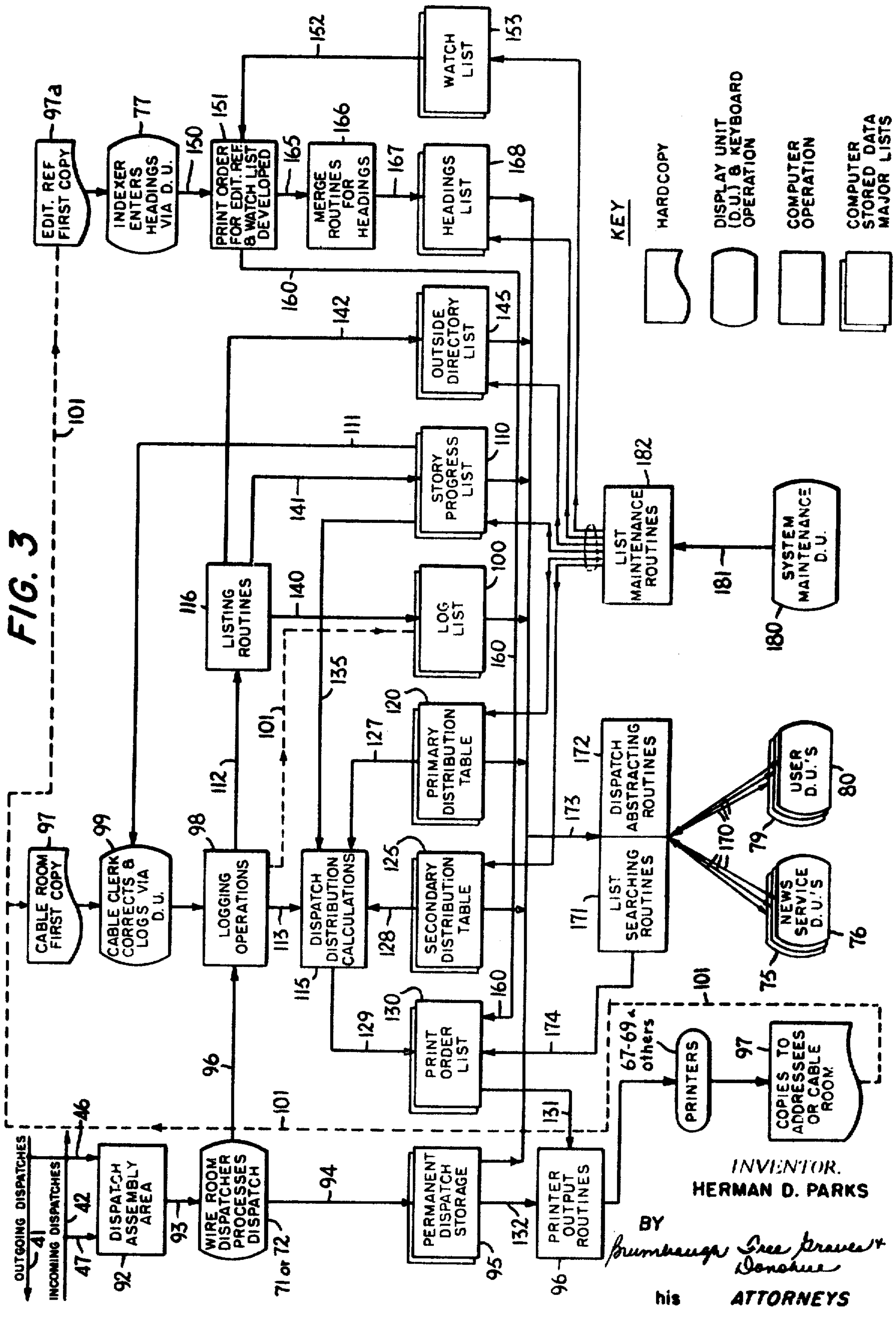
FIG. 3 is a flow chart explanatory of the mode of operation of the FIG. 2 system.

FIG. 3 is a flow chart of the major operations and flow of information within the FIG. 2 system. Also diagrammed are the major lists maintained and used by the computer in response to information fed in by the operators and users. Most of these lists appear in a horizontal row across the center of the flow chart. The contents and functions of such lists will be later described.

Considering first the initial handling of received dispatches, the signals representing a particular dispatch are fed via the appropriate one of lines 46, 47 and 48 to adapter 50 and are converted into coded data representing the text of the dispatch. That data is then routed via central data-processing unit 55 either to its internal magnetic core memory or to the external short term data storage device 60. In either case, the memory involved serves as an assembly area 92 (FIG. 3) for dispatches.

A separate data storage area is provided for text data derived from each separate one of the different lines 41, 42 and 43. Those data storage areas are each periodically inspected by a clerk in the wire room to determine what dispatches if any, have accumulated in that area since the last review. Each such inspection is conducted via one of the display units 71 and 72 in the wire room. That is, the clerk operates, say, unit 71 to command readout and display of the text of all dispatches which have been received from, say, lines 42, and which have been accumulated in storage since the last check.

The processor unit 55 responds to such command to retrieve all the corresponding coded text from the appropriate storage area and to feed such data via data flow path 93 to unit 71 so as to cause display by that unit of the text of all such dispatches. That text will appear in the form of successively displayed character frames. The clerk watches those frames and waits for the appearance of a breakpoint between consecutive dispatches. When such a point occurs, the clerk uses the keyboard of unit 71 to generate a signal indicative thereof. Immediately thereafter, the clerk types in on the keyboard certain preliminary logging information which concerns the dispatch immediately preceding the breakpoint, such logging information being converted into a flow of logging signals from the keyboard. That preliminary information may include the name of the person or section to whom the dispatch is addressed, the date and time of arrival of the dispatch, its word count, and the communications circuit from which the dispatch was delivered.

Upon completion of the logging of such preliminary information, the clerk strikes the keyboard to produce an "entry" command signal which effects the following operations. First, processor unit 55 is programmed to respond to that signal so as to assign to the related dispatch a distinctive dispatch number represented by coded data. Also, unit 55 is programmed to respond so as to feed via data path 94 the coded text data of the dispatch and the coded data representing the number of the dispatch to a permanent dispatch storage area 95 (FIG. 3) provided by a selected one of the long term data storage devices 61, 62, 63 (FIG. 2). In that storage area, the coded data representing the text of the dispatch is stored in correlated relation with the dispatch number so that such coded text data is identified by such number and can be located in storage and retrieved therefrom by referring merely to the associated dispatch number.

As a third operation, the processor unit 55 responds to the logging signals fed from display unit 71 via data path 96 to undertake logging routines 98 so as to cause the preliminary logging information which has been entered for the particular dispatch to the retrievably stored in the form of coded data (and in correlated relation with the coded data representing the dispatch number of the dispatch) in a long term data storage area 100 located in a selected one of memory units 61–63 (FIG. 2). The flow of the preliminary logging information into such area is represented by dashed line flow path 101. Area 100 is a storage area for the logging information pertaining to each dispatch of all received dispatches. Hence, area 100 provides a log list. Since in area 100 the logging data pertaining to each dispatch is stored in correlated relation with the data representing the dispatch number for such dispatch, an item of logging information located by electronic searching of the log list may be readily correlated through the associated dispatch number with the text of the dispatch (stored as coded data in area 95) to which that item of logging information pertains.

After storage of the data corresponding to the text of the dispatch has been effected in area 95, processor 55 is controlled by signals derived from a programmed retrieving of the information provided by such stored data (such retrieving taking place without destruction of the stored data) to engage in printer output routines 96 so as to selectively actuate one or ones of printers 67–69 to printout one or more individually addressed first hardcopies 97 of the text of the dispatch and of the associated dispatch number. If the addressee designated by the dispatch is other than News Service, then an addressed first hardcopy 97 is produced by the printer nearest the specific person for whom the dispatch is destined. If, on the other hand, the dispatch is intended to be received by News Service, then it is so addressed and (as indicated by dashed line flow path 102) a first hardcopy 97 is produced by printer 67 in the cable room (FIG. 2).

Assuming that the first hardcopy 97 of a particular dispatch is addressed to News Service and has been produced by the printer 67, a clerk in the cable room performs the following further operations in respect to such dispatch.

From inspection of hardcopy 97, any errors in the text of the dispatch as transmitted will be readily apparent. If there are one or more of such errors, the cable clerk effects a correcting operation 99 by calling for the inaccurate lines of text to be displayed on the screen of one of display units 73 and 74 (FIG. 2) and by then using the keyboard of the selected display unit to overwrite the erroneous record shown by the display. Each corrected frame is then returned to storage area 95 to provide a clean copy of the dispatch. The uncorrected text, however, is also kept in storage for reference in case any question arises regarding the alteration of the dispatch.

Having effected any necessary corrections, the cable room clerk proceeds to the main logging operation 98 whose basic purpose is to provide the computer with enough information about the dispatch to permit it to carry out primary and secondary distributions of the dispatch as well as to update the various lists maintained by the computer. That main logging operation is performed as follows.

The clerk places next to the display screen 86 of, say, the display unit 73 a logging guide card 105 (FIG. 4). Guide card 105 has printed thereon a number of vertically listed titles of which each registers horizontally with one of the lines on which characters are adapted to be displayed by screen 86. The meanings of those titles will now be explained in the vertical order (from top to bottom) in which they appear.

The title "LOG" indicates that the clerk is to produce via the keyboard the word LOG on line 01 of the display. The typing of "LOG" indicates to the processor unit 55 that the purpose of the frame being entered on screen 86 is to provide main logging information. Upon receiving such indication, the processor is automatically readied to call into play the proper programmed routines for processing that information.

Opposite the title "Dispatch Number," the clerk enters the dispatch number which appears on hardcopy 97, and which has already been assigned by the computer to the dispatch reproduced in alphanumeric form by that hardcopy.

Opposite title number 3, the clerk enters on screen the abbreviations "INC" or "OUT" when, the considered dispatch is, respectively, an incoming and an outgoing dispatch.

The line on screen 86 opposite title number 4 is left blank if the dispatch is a normal one. In the event the dispatch is confidential or personal, such can be indicated by entering the abbreviations "CON" or "PER" on line 04 so as to thereby block normal distribution of the dispatch.

The entries opposite title number 5 and 6 indicate respectively the magazine (or division of the company) and the section of such magazine (or division) to which the dispatch relates. In this connection it might be noted that the company using the described system may publish several magazines.

The title "Contents" is an important one for logging purposes because the corresponding entry on screen 86 indicates the nature of the dispatch. That is, such entry indicates whether the dispatch is a suggestion from the field for a story, an advisory to the field of a scheduled story, a major query concerning a scheduled story, and so on. Various appropriate abbreviations may be used as entries to screen 86 for the purpose of indicating all of the different ones of a list of categories which relate, say, to the progress being made on a story and under which dispatches may be classified according to the nature of each. For example, the entry shown in FIG. 4 of "RES REQ FUL" indicates that the dispatch is in the nature of a query requesting that research be done in full on a particular scheduled story.

The entry corresponding to the title of LISTING/CHECKOFF is also of importance because it is the entry which is primarily determinative of the main distribution of printed copies of the dispatch. The proper entry to use opposite the last-named title is ascertained in a manner as follows.

Referring back to FIG. 3, the described system has a long term data storage area 110 located in a selected one of storage devices 61–63 (FIG. 2) and containing retrievably stored coded data providing a "story progress" list made up of a sequence of groups of items of information which are correlated with each other within each group. The first and second items in each such group may, say, be respectively, a coded data string representing a story number assigned to a particular story in the list of scheduled stories and a data string representative of a brief description of such story. As indicated by flow path 111, the cable room clerk has a printout from area 110 of the information contained in that area. By comparing the brief description of stories in the printout with the contents of the particular dispatch reproduced by hardcopy 97, the clerk can determine the story number which applies to that dispatch, and, thereupon, the clerk types such story number on keyboard 85 (FIG. 4) to provide the entry on screen 86 opposite the LISTING/CHECKOFF title.

Title 09 of guide card 105 is used for multipart dispatches to allow entries indicating that more of the dispatch is to come or that the dispatch is at and end. The entry opposite title 010 sets out the name of the person in the field originating on incoming dispatch or designated to receive an outgoing dispatch. Consonantly, the entries opposite titles 011 and 012 setout, respectively, the name and the address of the bureau with which that person is associated.

The line on screen 86 opposite title 013 is ordinarily left blank but can be filled in with instructions such as HOLD (i.e., hold part or all of the distribution of the dispatch) in instances where further clarification is needed or the file is not complete. Lines 14, 15 and 16 on screen 86 are reserved for the entry of names of persons who should be recipients of a dispatch in addition to or in lieu of the persons on the normal distribution list for that dispatch.

Having completed as described the logging operations 98, the clerk in the cable room strikes on keyboard 85 an appropriate key causing transfer to processor unit 55 of the information displayed by the logging frame. As indicated by data flow paths 112 and 113, that transfer initiates the undertaking by unit 55 of dispatch distribution calculations 115 and listing routines 116 in respect to such information.

Considering first the dispatch distribution calculations, the described system is characterized by a data storage area 120 located in a selected one of long term storage devices 61–63 (FIG. 2) and providing a file of coded data in the form of sequence of groups of such data of which the items of data in each group are correlated with each other. The first item in each such group is a coded data string representative of the name of a particular addressee. The second item in each group is a coded data string identifying the printer nearest to that addressee.

The addressees and printers represented by the data groups are designated in area 120 as being on various distribution lists by the selective correlation of stored coded data strings representing, say, story numbers with the various paired items of data representing each addressee and the printer nearest thereto. That is, if say, addressees "A," "B" and "C" are intended to be on a distribution list for all dispatches pertaining to the story designated by number 1,357, then a string of coded data representing such number 1,357 will be included in each of the three groups of coded data which set out as their first item the names of "A," "B" and "C," respectively. Similarly if, say, addressees "B," "C" and "D" are intended to be on a distribution list for all dispatches pertaining to a story designated by number 1,401, then a coded string of data corresponding to number 1,401 will be included in each off addressee groups "B," "C" and "D." From what has been said, it will be evident that any addressee (and the printer nearest to him) may be correlated with none, one or more than one coded data string each representing one particular story number. Also, it will be evident that, in the stored data file provided by storage area 120, all data strings which are coded in the same way (to represent, say, the same story number) are representative of the same distribution list and, consonantly, different codings for the list-denoting data strings are indicative of different distribution lists.

The storage area 120 thus provides a dispatch distribution table which is a primary table in the sense that it will be almost invariably used as a factor in determining the distribution of dispatches. In addition, however, to the primary table, the described system also has a storage area 125 located in a selected one of the long term storage devices 61–63 (FIG. 2) and providing a file of stored coded data representative of a secondary distribution table. The secondary table differs from the primary table by providing a much more extensive listing of addressees and being used less frequently than the primary table. It is generally the case that the two tables will overlap in respect to the addressees listed by each.

As indicated by flow paths 126, 127 and 128 the main inputs to the processor unit 55 for the purpose of making the dispatch distribution calculations 115 are feeds of data from the logging frame entered on display unit 73 and from respectively, the table 120 and the table 125. To describe briefly those calculations the string of coded data entered on line number 8 of the logging frame (FIG. 4) and representing (by way, say, of a story number) a particular distribution list is compared for a match with the list-denoting strings of coded data in each of tables 120 and 125. Whenever a match is attained of such data string from the logging frame with a data string from one of the tables, the name of the addressee correlated with the latter string and the designation of the printer nearest such addressee and the dispatch number of the particular dispatch are transferred (in data signal form) by way of flow path 129 from the table in which such information was stored (and continues to be stored) to a data storage area 130 which is located in the short term memory 60 (FIG. 2).

Area 130 accumulates the received data to thereby provide a "revolving" print order list which may consist entirely of the single print order for each dispatch processed in turn or (preferably) may consist of a succession of the accumulated print orders of a succession of such processed dispatches. The dispatch distribution calculations and the resulting storage of data in the print order list are conducted in such a way that duplication is eliminated between addressees listed in both table 120 and table 125 as being on the distribution list designated for any particular dispatch. As will be evident, the addressees embraced by the print order for each dispatch will be those determined conjointly by tables 120 and 125 together with the specific addressees listed in lines 014, 015 and 016 of the logging frame.

When the print order for a dispatch has been fully entered into storage area 130, that order awaits its turn until higher priority print orders have been taken care of. When that time is reached (and as indicated by flow path 131), processor unit 55 is controlled by the print order now in first place to undertake printing routines 96 determined by such print order. That is, the data-processing unit 55 responds to the feed of data (from list 130) which represents that order to do the following: (a) select for actuation the ones of the printers 67–69 (and other printers) which are nearest to the addressees designated by the order, (b) cause the selected printers to print out fan fold copies in alphanumeric form of the dispatch in question, (c) further cause the copy for each recipient designated by the order to be individually addressed to that recipient by the printer nearest thereto. In this connection, it might be noted that the processor unit is able to carry out such routines because it is informed from the list 130 of the dispatch number of the dispatch to be reproduced, wherefore (and as indicated by flow path 132) the unit 55 can call out from the permanent dispatch storage file 95 the text of the appropriate dispatch.

The dispatch distribution calculations 115 have been described above as involving nothing more than the simple procedure of (a) utilizing the story number of a scheduled story as the designations of the distribution list for dispatches pertaining to that story, (b) comparing for a match the data string derived from logging operations 98 and representing such story number with the list-denoting data strings provided by tables 120 and 125 and coded according to story number, and (c) deriving from the matches so attained and from specific addressees entered in the logging frame the print order for the dispatch. It will be appreciated, however, that e dispatch distribution calculations may be much more complex. For example, as illustrated by the entry "4 123401" on line 08 of the logging frame (FIG. 4), each story number derived from list 110 may be divided into two parts of which the second part (i.e., "123401") distinctively identifies the related story, and only the first part (i.e., "4") uses different numbers to designate different distribution lists. The latter lists may reflect established procedures such as, say, that all addressees in a first selected group are to receive copies of dispatches pertaining to stories dealing with international news, all addressees in a second selected group are to receive copies of dispatches pertaining to stories dealing with sports, and so on. The advantage in so multiply coding the story numbers (and in the use of the topical approach in the determination of distribution lists) is that such technique avoids the need for up-dating the list-denoting codings stored in tables 120 and 125 each time a new list of scheduled stories is entered in storage area 110. Obviously, the part of the story number which determines the distribution list for the associated dispatch may itself be subdivided into a plurality of coded subparts of which each designates a different group of addressees (which have been selected for different reasons) as recipients for the dispatch.

As a further consideration, the entry (on line 07 of the logging frame) indicating the dispatch "nature" may have a modifying effect on the distribution list for the associated dispatch. That is, such entry may exert a degree of control over the list such that certain addressees on the list are excluded from receiving copies of advisory dispatches, certain other addressees receive copies only of dispatches concerning personnel or administrative matters, and so on.

Still further, the dispatch distribution calculations may be controlled in part by data supplied via flow path 135 from the story list 110. For example, if a dispatch has to do with a story to which a specific writer has been assigned as indicated by coded data appearing in correlated relation in list 110 with the number for such story, then information supplied from list 110 via path 135 to the dispatch distribution calculations will serve to add that writer to the distribution list for such dispatch.

Moreover, the print order list 130 may be controlled by instructions derived from the activities of the Editorial Reference section (FIG. 1) so as to cause a supplemental printout of copies of the dispatch in accordance with those instructions. Such supplemental control of printout by the Editorial Reference section will be later described in more detail.

Returning now to the listing procedures 116, after the processor unit 55 has performed its printing tasks, it proceeds automatically to store the information contained in the logging frame in the data storage areas shown as FIG. 3 as being storage areas for lists.

More specifically, data corresponding to a formalized version of the entire logging frame for each dispatch is supplied via flow path 140 to log list area 100 to be stored therein in correlated relation with the preliminary logging information pertaining to that dispatch and logged by the clerk in the wire room. Such correlation is made possible by the fact that such preliminary logging information (from the logging frame) is designated by the same dispatch number as that which appears in the logging frame. The log list so formed in area 100 provides a valuable record because it can later be searched for all dispatches characterized by the same logging information entry or combination of logging information entries to thereby permit ready sorting of dispatches into classes of interest.

Second, information from the logging frame is fed via flow path 141 to the story list in storage area 110. As earlier stated such list is comprised of groups of coded data items which respectively correspond to scheduled stories, and of which the first and second items in each group are representative of a number assigned to the corresponding story and a brief description thereof. From a logging frame designated by a given story number there is added to the data group in list 110 designated by the same story number some further items of data which, at the least, consist of the dispatch number of the dispatch to which the frame relates and a designation (from line 07 of the frame) of the nature of the dispatch. As the scheduled stories progress towards completion by an interchange of dispatches concerning each as described in connection with FIG. 1, more dispatch numbers and dispatch "nature" designations are added to each data group in list 110 corresponding to each particular story. List 110 thus becomes a story progress list wherein each entry via a logging frame serves a checkoff that another step has been completed in the preparation of a particular story. By retrieving and obtaining an alphanumeric printout of the entire list as it stands at any time, a quick and comprehensive review may be had of the progress status of every story on the scheduled story list.

Third, as a result of entry of a logging frame and the consequent listing routines 116, data is fed via flow path 142 to a long term data storage area 145 providing an "outside directory" list of retrievably stored coded data pertaining to bureaus, correspondents and other people in the field. That is, such list is comprised of groups of items of coded data which respectively correspond to all such persons, and of which the first item in each group represents the name of the corresponding person. The data group pertaining to any particular person also includes other data items entered by a route other than through the logging frame and representing information relevant to the whereabouts of such person as, for example, his current address, location and bureau assignment. The feed of data via path 142 causes storage in list 145 in correlation with each data group representing a particular person (and his whereabouts) of the dispatch numbers of all dispatches sent to or sent from that person. Thus, list 145 by retrieval and printout of data therefrom permits quick look-up of, say, the whereabouts of any correspondent in the field, his work load in terms of dispatches, the progress being made on dispatches for which he is responsible, etc.

Coming now to the activities of the Editorial Reference section, an employee in that section receives a reproduction of each News Service dispatch in the form of a hardcopy 97*a* which is preferably printed out at the same time as the first hardcopy 97 of the dispatch. Having received hardcopy 97*a*, that employee then utilizes one of the display units 77 and 78 (FIG. 2) in the Editorial Reference section (i.e., say, unit 77) to enter via keyboard 85 (FIG. 4) onto screen 86 the dispatch number of the dispatch. Such number may appear on line 01 of the frame. Thereafter, the employee operates the keyboard to enter into subsequent lines of the frame a series of designations of subject headings under which the dispatch may be classified. The subject headings which are entered (by way of designations thereof) and selected from an overall list of such headings representing a filing or classification scheme for all dispatches.

When a dispatch has been completely indexed as described, the employee appropriately operates keyboard 85 of unit 77 to cause transfer via flow path 150 of the information entered onto screen 86 to processor unit 55 (FIG. 2) and subsequent undertaking by unit 55 of operations 151 developing a print order for a copy of the dispatch to be supplied under each subject assigned to that story by the Editorial Reference Section. The generation of the print order is also controlled by a feed of data via flow path 152 from a watch list maintained in a long term data storage area 153 located in one of the long term storage devices 61–63. The watch list is comprised of coded data items wherein the first data item in each group is representative of a particular addressee desiring to receive all dispatches classified under one or more specified subject headings, and wherein subsequent coded data items in each group indicate the one or more subject headings in which that addressee is interested. The effect of the feed of data from watch list 153 is to modify the print order developing operations 151 so as to include in the print order all addressees requesting a copy of a dispatch when classified under a particular subject heading or headings.

When operations 151 have been completed, the resulting print order is fed (in the form of coded data) via flow path 160 to storage area 130 to be merged without overlapping of addressees with the main print order list stored in that area. As a result, the printing output routines are enlarged to cause actuation of selected printers and printout thereby of copies of the dispatch such that (a) addressees on watch list 153 each receive an individually addressed copy delivered by the nearest printer, and (b) one copy of the dispatch for each subject heading under which the dispatch has been indexed is delivered (labeled with that subject heading) by printer 69 in the Editorial Reference section to thereby provide a file copy of the dispatch for the proper paper file maintained under that heading.

Subsequent to completion of print order operations 151, the processor unit 55 by way of path 165 receives a feed of the subject heading indexing data entered from the display unit 77 (and say, temporarily stored in a short term data storage area). Unit 55 then rearranges such data by merge routine operations 166. Such rearrangement in effect involves generating a coded data item representing the dispatch number of the dispatch "opposite" (i.e., in correlation with) each coded data item representing one of the subject headings under which the dispatch has been indexed. The resulting rearranged data is then fed via flow path 167 to a long term data storage area 168 for a "headings list" to be added to the information already stored therein. Such headings list is comprised of a sequence of groups of coded data items of which the groups respectively correspond to all the subject headings in the overall classification scheme for all dispatches. In each group, the first coded data item designates the subject heading corresponding to that particular group, and subsequent coded data items identify by dispatch number all dispatches which have been classified under that heading. Headings list 168 can be scanned for any particular subject heading therein, and retrieval and printout can then be had of all dispatch numbers indicated by the list as correlated with that heading. Obviously, therefore, the headings list 168 provides a valuable tool for research.

It should be noted that the operations by the Editorial Reference Section of indexing a dispatch (by the described use of display unit 77) and of developing a print order derived from such indexing need not be "on-line" with the logging operations of the cable room and the print order called for by such logging operations so as to permit the satisfying of both print orders by one running through by the processor unit 55 of printer output routines 96. Instead, the hardcopy 97*a* used by the Editorial Reference section may be a copy of the dispatch produced as a result of the printout ordered by the logging operations 98 and dispatch distribution calculations 115, and the activities of the Editorial Reference section may then cause a subsequent printout to occur for the purposes of supplying copies for the files of that section and for the addressees on the watch list 153.

Having discussed how the described system may be used to maintain lists and to effect printouts, consideration will now be given to other ways in which the system may be used. In general, the system acts as a central electronic file for all the information which has heretofore been scattered among a number of paper files. That central file is accessible by communication with the system through the display units thereof.

For example, the typing of the dispatch number of a desired dispatch on either one of the News Service display units 75, 76 or on one of the "user" display units 79, 80 (FIGS. 2 and 3) may generate command signals transmitted via two-way paths 170 (FIG. 3) to processor unit 55 to cause the same to undertake list-searching routines 171 and dispatch-abstracting routines 172. Those routines ultimately result in a flow (via path 173) of data producing on the screen of the employed display unit a reproduction of one part after another of the text of the desired dispatch. Hence, the contents of any dispatch may be reviewed without the need for having a paper copy of it. If either before or after review, however, a paper copy of the dispatch is wanted, such copy can be obtained through a command originated at the display unit and causing via path 174 the printout of that copy.

Moreover, the system can be commanded to search for designated information stored in any of the lists maintained thereby and to make either such information or entire ones of such lists available either by way of a display on a selected display unit or by way of a printout.

From the foregoing description, it will be evident that some of the data stored in the lists of the system is a byproduct of the logging operations performed in connection with each received dispatch and of the classifying operations of the Editorial Reference section performed in connection with such dispatch. The remainder of the data in the lists is entered and up-dated by the employment of a display unit 180 operated by list maintenance personnel. Appropriate instructions typed in on the keyboard of that unit are communicated via path 181 to processor unit 55 to cause unit 55 to undertake list-maintenance routines 182 which effect desired additions to and desired replacements in and clearances of the stored data constituting the list selected for attention. The display unit 180 is thus employed, for example, (1) to provide all the stored data of distribution tables 120 and 125, (2) to enter the numbers of scheduled stories and brief descriptions thereof in story progress list 110, and (3) to add to the outside directory list 145 the "whereabouts" information which is needed but is not entered in that list as a result of the logging operations 98.

The above described embodiment being exemplary only, it is to be understood that additions thereto, modifications thereof and omissions therefrom can be made without departing from the spirit of the invention, and that the invention comprehends embodiments differing in form and/or detail from that which has been specifically described. Accordingly, the invention should not be considered as limited save as consonant with the recitals of the following claims.

I claim:

1. A method for processing electrically transmitted dispatches comprising generating a string of coded data representative of a distinctive dispatch number of each such dispatch, retrievably storing in correlated relation both said data string and coded data derived from the transmission signals corresponding to such dispatch and representative of the text of such dispatch, retrieving said data string and coded data from storage and controlling printer means by said data string and coded data to printout a first paper copy in alphanumeric form of the text of said dispatch and of the associated dispatch number, generating after analysis of the contents of said first copy a plurality of logging signals inclusive of the string of data representative of the dispatch number of said dispatch and a string of coded data designating a list of persons selected as addressees for said dispatch out of a larger directory of such persons, said directory being represented by items of coded data retrievably stored in correlated relation with different data strings denoting different dispatch distribution list so as to thereby form a retrievably stored distribution table for dispatches, retrieving the information stored in said table and then comparing for a match the list-denoting data string corresponding to said logging signal with the list-denoting data strings retrieved from said table so as to form a print order list corresponding to the matches attained, and controlling said printer means as a function of said print order list to printout copies of such dispatch which are in alphanumeric form and are individually addressed to the addressees on the list represented by the list-denoting data strings corresponding to said logging signal.

2. The method as in claim 1 comprising the further steps of electronically deriving the print order list for such dispatch both from a primary distribution table and a secondary distribution table, and electronically eliminating any overlap of addressees between the print order lists called for by each separately of said two tables.

3. The method as in claim 2 further comprising the steps of generating coded data signals each of which is representative of a different subject heading under which such dispatch may be classified, and electronically enlarging the print order list determined by said distribution table as a function of said coded data signals representing said subject headings.

4. The method as in claim 3 in which said logging signals are also inclusive of first and second strings of coded data representative of, respectively, the number of a story to which such dispatch pertains and the name of the person who is, respectively, the sender and the intended recipient of such dispatch when the same is, respectively, an incoming and an outgoing dispatch, said method further comprising the steps of electronically adding said first and second strings of coded data to, respectively, a first and a second retrievably stored sequence of groups of coded data, said first and second sequences being representative of, respectively, a story progress list and a whereabouts list.

PO-1050
(5/69)

UNITED STATES PATENT OFFICE
CERTIFICATE OF CORRECTION

Patent No. 3,611,301 Dated Oct. 5, 1971

Inventor(s) Herman D. Parks

It is certified that error appears in the above-identified patent and that said Letters Patent are hereby corrected as shown below:

Col. 1, line 24, after "amount" insert --of--. Col. 2, lines 27 and 28, delete "story formulating section comprised of writers and researchers"; line 64, "of" should read --on--. Col. 3, line 12, "filed" should read --field--; line 19, "llb" should be --lb--; line 28, "responsive" should read --responsible--; line 43, "in" should read --by--; line 67, "needed" should read --indeed--. Col. 5, line 10, "keyborad" should read --keyboard--. Col. 6, line 51, "to the" should read --to be--. Col. 8, line 30, "and" should read --an--. Col. 9, line 1, "off" should read --of--. Col. 10, line 14, "e" should read --the--. Col. 13, line 51, "number of" should read --number for--.

Signed and sealed this 16th day of May 1972.

(SEAL)
Attest:

EDWARD M.FLETCHER,JR.
Attesting Officer

ROBERT GOTTSCHALK
Commissioner of Patents